(12) United States Patent
Greeley et al.

(10) Patent No.: US 9,849,446 B2
(45) Date of Patent: Dec. 26, 2017

(54) SLURRY HYDROCONVERSION CATALYSTS

(71) Applicant: ExxonMobil Research and Engineering Company, Annandale, NJ (US)

(72) Inventors: John P. Greeley, Annandale, NJ (US); Paul Podsiadlo, Easton, PA (US); William Ernest Lewis, Baton Rouge, LA (US); Roby Bearden, Jr., Baton Rouge, LA (US); Amitava Sarkar, Calgary (CA); Mainak Ghosh, Calgary (CA); Ramanathan Sundararaman, Pearland, TX (US); Thomas F. Degnan, Jr., Philadelphia, PA (US); Manuel A. Francisco, Phillipsburg, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 0 days.

(21) Appl. No.: 15/241,185

(22) Filed: Aug. 19, 2016

(65) Prior Publication Data

US 2017/0050177 A1 Feb. 23, 2017

Related U.S. Application Data

(60) Provisional application No. 62/208,040, filed on Aug. 21, 2015.

(51) Int. Cl.
| | |
|---|---|
| *C10G 45/04* | (2006.01) |
| *B01J 27/051* | (2006.01) |
| *B01J 37/20* | (2006.01) |
| *B01J 23/881* | (2006.01) |

(Continued)

(52) U.S. Cl.
CPC ......... *B01J 27/0515* (2013.01); *B01J 23/881* (2013.01); *B01J 37/18* (2013.01); *B01J 37/20* (2013.01); *C10G 45/04* (2013.01); *C10G 47/06* (2013.01)

(58) Field of Classification Search
CPC ........ B01J 27/0515; B01J 37/18; B01J 37/20; B01J 23/881; C10G 47/06; C10G 45/04
See application file for complete search history.

(56) References Cited

U.S. PATENT DOCUMENTS

| | | |
|---|---|---|
| 4,135,825 A | 1/1979 | Kertscher |
| 4,192,735 A | 3/1980 | Aldridge et al. |
| 5,171,727 A | 12/1992 | Gatsis |

(Continued)

OTHER PUBLICATIONS

PCT/US2016/047693 Search Report and Written Opinion dated Oct. 25, 2016.

*Primary Examiner* — Randy Boyer
*Assistant Examiner* — Juan Valencia
(74) *Attorney, Agent, or Firm* — Andrew T. Ward

(57) ABSTRACT

Systems and methods are provided for slurry hydroconversion of a heavy oil feedstock, such as an atmospheric or vacuum resid, in the presence of an enhanced or promoted slurry hydroconversion catalyst system. The slurry hydroconversion catalyst system can be formed from a) a Group VIII non-noble metal catalyst precursor/concentrate (such as an iron-based catalyst precursor/concentrate) and b) a Group VI metal catalyst precursor/concentrate (such as a molybdenum-based catalyst precursor/concentrate) and/or a Group VI metal sulfided catalyst.

17 Claims, 9 Drawing Sheets

(51) Int. Cl.
    *C10G 47/06*     (2006.01)
    *B01J 37/18*     (2006.01)

(56) References Cited

U.S. PATENT DOCUMENTS

| | | |
|---|---|---|
| 5,288,390 A | 2/1994 | Durante |
| 5,288,681 A | 2/1994 | Gatsis |
| 5,362,398 A | 11/1994 | Kamphuis et al. |
| 5,474,977 A | 12/1995 | Gatsis |
| 5,755,955 A | 5/1998 | Benham et al. |
| 8,277,638 B2 | 10/2012 | Bhattacharyya et al. |
| 2010/0176025 A1 | 7/2010 | Kumar et al. |
| 2011/0210045 A1 | 9/2011 | Kou et al. |
| 2011/0306490 A1* | 12/2011 | Bhattacharyya ......... B01J 21/04 502/220 |
| 2013/0112593 A1 | 5/2013 | Montanari et al. |
| 2014/0374314 A1* | 12/2014 | Sundararaman ....... C10G 49/06 208/78 |

* cited by examiner

| | Aromatic 165-90 ppm | Aliphatic 90-0 ppm | -O-C- |  |  |  | Aromatic cluster size |
|---|---|---|---|---|---|---|---|
| Pitch from Mild Slurry Hydroprocessing | 70.5 | 29.5 | 1.3 | 0.7 | 0 | 0 | 15.5 |
| Pitch after Oxidative Ring Opening | 65.8 | 32.4 | 2.6 | 1.9 | 1.7 | 0 | 14 |

|  | Cat System A | Cat System B | Cat System C | Cat System D | Cat System E |
|---|---|---|---|---|---|
| Iron Source | $Fe(CO)_5$ | $Fe(CO)_5$ | $FeSO_4$ | $FeSO_4$ | $FeSO_4$ |
| Fe on Feed (wppm) | ~3000 | ~3000 | ~2210 | ~1920 | ~1920 |
| Mo Source | PMA (presulfided preformed) | PMA (presulfided) | PMA (presulfided preformed) | PMA (presulfided) | PMA (presulfided) |
| Mo on Feed (wppm) | ~116 | ~116 | ~170 | ~174 | ~174 |
| TI on 975F+ feed (wt%) | ~1.9 | ~1.8 | ~6.4 | ~1.6 | ~1.8 |
| Equivalent Mo (wppm) | ~230 | ~250 | ~13 | ~270 | ~240 |
| Mo/Fe weight ratio | ~26 | ~26 | ~13 | ~11 | ~11 |

FIG. 9

SLURRY HYDROCONVERSION CATALYSTS

CROSS-REFERENCE TO RELATED APPLICATIONS

This application claims the benefit of U.S. Provisional Application No. 62/208,040, filed on Aug. 21, 2015, the entire contents of which are incorporated herein by reference.

BACKGROUND OF THE INVENTION

Slurry hydroconversion provides a method for conversion of high boiling, low value petroleum fractions into higher value liquid products. Slurry hydroconversion technology can process difficult feeds, such as feeds with high CCR weights, while still maintaining high liquid yields. In addition to vacuum resid feeds, slurry hydroconversion units have been used to process other challenging streams present in refinery/petrochemical complexes such as deasphalted rock, steam cracked tar, and visbreaker tar.

Various slurry hydroconversion configurations have previously been described. For example, U.S. Pat. No. 5,755,955 and U.S. Patent Application Publication No. 2010/01222939 provide examples of configurations for performing slurry hydroconversion. U.S. Patent Application Publication No. 2011/0210045 also describes examples of configurations for slurry hydroconversion, including examples of configurations where the heavy oil feed is diluted with a stream having a lower boiling point range, such as a vacuum gas oil stream and/or catalytic cracking slurry oil stream, and examples of configurations where a bottoms portion of the product from slurry hydroconversion is recycled to the slurry hydroconversion reactor.

U.S. Pat. No. 5,171,727 describes a method for preparing a catalyst, which is similarly referenced in U.S. Pat. Nos. 5,288,681 and 5,474,977. The method involves introducing a metal and a heteropolyacid into an oil feed. The feed is then heated to form an organometallic compound, which is then converted to a catalyst under hydroconversion conditions. The metal is described as an oxide, sulfide, or salt of a Group IV to Group VIII metal. The heteropolyacid can be phosphomolybdic acid in an amount, expressed as Mo, of 0.01 wt % to 2 wt %.

U.S. Pat. No. 8,277,638 describes a method for conversion of heavy oil fractions in the presence of an iron sulfide catalyst that is formed from iron oxide in the presence of hydrogen and sulfur. The catalyst is described as being suitable for conversion of about 85% of the pitch or heavy portion of a feed.

U.S. Patent Application Publication No. 2013/0112593 describes a reaction system for performing slurry hydroconversion on a deasphalted heavy oil feed. The asphalt from a deasphalting process and a portion of the unconverted material from the slurry hydroconversion can be gasified to form hydrogen and carbon oxides.

U.S. Patent Application Publication No. 2014/0374314 describes methods for slurry hydroconversion of heavy oil feeds. In some aspects, a catalyst system comprising co-catalysts containing Mo and Fe can be used for slurry hydroconversion.

SUMMARY OF THE INVENTION

In an aspect, a method for forming a slurry catalyst is provided, the method comprising: dispersing a first catalyst precursor/concentrate comprising a Group VIII non-noble metal and a second catalyst precursor/concentrate comprising a Group VI metal in a feedstock comprising a heavy oil fraction, an amount of the Group VI metal in the second catalyst precursor/concentrate in the feedstock being about 250 wppm or less, a weight ratio of the Group VIII non-noble metal in the first catalyst precursor/concentrate to the Group VI metal in the second catalyst precursor/concentrate in the feedstock being at least 10; and sulfiding the first catalyst precursor/concentrate and the second catalyst precursor/concentrate to form a sulfided catalyst system. Optionally, the second catalyst precursor/concentrate can comprise phosphomolybdic acid, a molybdenum heteropolyacid of different composition, or a combination thereof. Optionally, the Group VIII non-noble metal catalyst precursor/concentrate can comprise a water-soluble precursor/concentrate and/or the Group VIII non-noble metal catalyst precursor/concentrate can comprise a counter-ion or ligand comprising sulfate, nitrate, acetate, citrate, carbonyl (carbon monoxide as a ligand).

In another aspect, a method for forming a slurry catalyst is provided, the method comprising: dispersing a first non-sulfur-containing catalyst precursor/concentrate comprising a Group VIII non-noble metal in a feedstock comprising a heavy oil fraction, the feedstock further comprising a sulfided Group VI metal catalyst, an amount of the Group VI metal in the sulfided Group VI metal catalyst in the feedstock being about 250 wppm or less; and sulfiding the first catalyst precursor/concentrate to form a sulfided catalyst system, wherein a weight ratio of the Group VIII non-noble metal to the Group VI metal in the sulfided catalyst system is at least about 10.

In still another aspect, a sulfided catalyst system is provided, the sulfided catalyst system being formed by a method comprising: dispersing a first catalyst precursor/concentrate comprising a Group VIII non-noble metal and a second catalyst precursor/concentrate comprising a Group VI metal in a feedstock comprising a heavy oil fraction, an amount of the Group VI metal in the second catalyst precursor/concentrate in the feedstock being about 250 wppm or less, a weight ratio of the Group VIII non-noble metal in the first catalyst precursor/concentrate to the Group VI metal in the second catalyst precursor/concentrate in the feedstock being at least 10; and sulfiding the first catalyst precursor/concentrate and the second catalyst precursor/concentrate to form the sulfided catalyst system.

In yet another aspect, a sulfided catalyst system is provided, the sulfided catalyst system being formed by a method comprising: dispersing a first non-sulfur-containing catalyst precursor/concentrate comprising a Group VIII non-noble metal in a feedstock comprising a heavy oil fraction, the feedstock further comprising a sulfided Group VI metal catalyst, an amount of the Group VI metal in the sulfided Group VI metal catalyst in the feedstock being about 250 wppm or less; and sulfiding the first catalyst precursor/concentrate to form a sulfided catalyst system, wherein a weight ratio of the Group VIII non-noble metal to the Group VI metal in the sulfided catalyst system is at least about 10.

BRIEF DESCRIPTION OF THE FIGURES

FIG. 9 shows results from slurry hydroconversion of a feedstock in the presence of various catalyst systems.

DETAILED DESCRIPTION OF THE EMBODIMENTS

Overview

Figure 1:
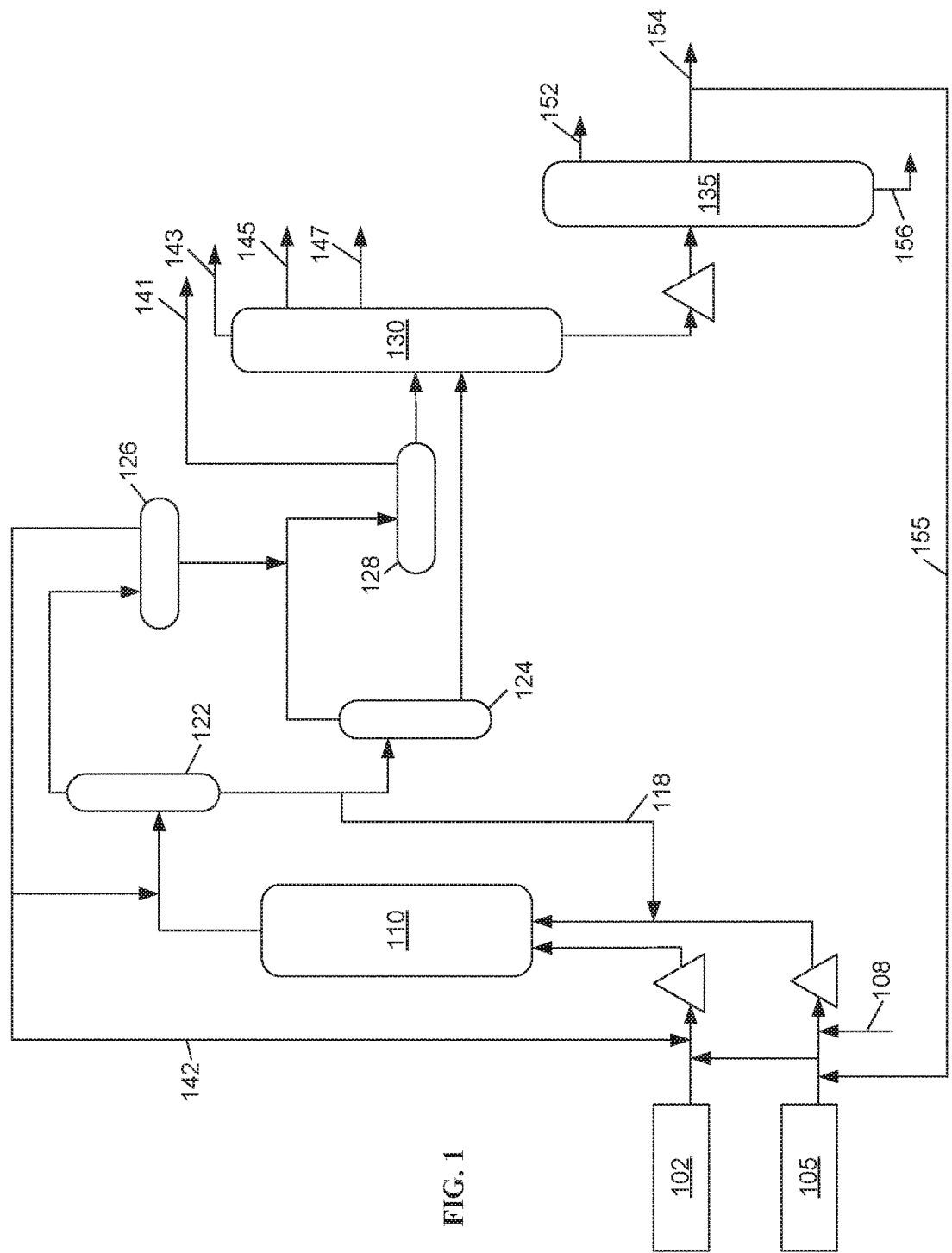
FIG. 1 shows an example of a slurry hydroconversion reaction system.

In various aspects, systems and methods are provided for slurry hydroconversion of a heavy oil feed, such as an atmospheric or vacuum resid, in the presence of an enhanced or promoted slurry hydroconversion catalyst system. The slurry hydroconversion catalyst system can be formed from a Group VIII non-noble metal catalyst precursor/concentrate (such as an iron-based catalyst precursor/concentrate) and a Group VI metal catalyst precursor/concentrate (such as a molybdenum-based catalyst precursor/concentrate). Additionally or alternately, a Group VI metal sulfided catalyst can be used in combination with non-sulfur-containing Group VIII non-noble metal catalyst precursors/concentrates. Conventionally, Mo-based slurry hydroconversion catalysts exhibit higher activity. However, due to the high cost of Mo-based slurry hydroconversion catalysts, Fe-based catalysts are sometimes preferred. It has been discovered that using a combination of Mo-based catalyst and Fe-based catalyst leads to a synergistic improvement in overall catalyst activity that would not be expected based on the individual activities of the catalysts. The combination of Fe and Mo within the catalyst system can allow a lower cost Fe catalyst to contribute in an unexpectedly significant manner to the overall activity of the catalyst system.

In some alternative aspects a slurry hydroconversion reaction system is provided that provides for cross-flow filtration of slurry solution or suspension to allow for removal of small catalyst particles, such as nano-catalyst particles. This can allow for use of small catalyst particles without requiring a recovery process that involves combustion of a slurry hydroconversion pitch fraction.

In still other aspects, oxidative ring opening methods can be used as a supplemental process to allow for improved conversion of slurry hydroconversion pitch that is generated as a bottoms or residue fraction during a slurry hydroconversion process. Oxidative ring opening methods can allow for conversion of multi-core aromatics to compounds with fewer numbers of rings under relatively mild conditions.

Slurry hydroconversion generally refers to processes for upgrading a petroleum feed in the presence of hydrogen and a catalyst that is entrained in or otherwise dispersed in the feed. Typically, slurry hydroconversion is used for processing of heavy oil feeds, as described in further detail herein.

One way of defining a feedstock is based on the boiling range of the feed. One option for defining a boiling range is to use an initial boiling point for a feed and/or a final boiling point for a feed. Another option, which in some instances may provide a more representative description of a feed, is to characterize a feed based on the amount of the feed that boils at one or more temperatures. For example, a "T5" boiling point or distillation point for a feed is defined as the temperature at which 5 wt % of the feed will boil off. Similarly, a "T95" boiling point is a temperature at 95 wt % of the feed will boil. When determining a boiling point or a boiling range for a feed or product fraction, an appropriate ASTM test method can be used, such as the procedures described in ASTM D2887, D2892, or D86.

In various aspects, a resid fraction (or residual fraction) corresponds to a heaviest and/or highest boiling fraction from a temperature based fractionation process. An atmospheric resid corresponds to a fractionation bottoms from an atmospheric distillation or fractionation. A vacuum resid corresponds to a fractionation bottoms from a vacuum distillation or fractionation. Such resid fractions can have an initial boiling point (such as an initial ASTM D2892 boiling point) of 650° F. (343° C.) or greater. Preferably, a resid fraction can have an 10% distillation point (such as an ASTM D2892 10% distillation point) of at least 650° F. (343° C.), alternatively at least 660° F. (349° C.) or at least 750° F. (399° C.). In some aspects the 10% distillation point can be still greater (corresponding to a vacuum resid), such as at least 900° F. (482° C.), or at least 950° F. (510° C.), or at least 975° F. (524° C.), or at least 1020° F. (549° C.), or at least 1050° F. (566° C.). Such a 10% distillation point can be referred to herein as a "T10 boiling point". Other fractional weight boiling points, such as T5, T90, or T95 boiling points can be determined in a similar manner.

In addition to resid fractions, reference may be made to one or more types of fractions generated during distillation of a petroleum feedstock. Such fractions may include naphtha fractions, kerosene fractions, diesel fractions, and (vacuum) gas oil fractions. Each of these types of fractions can be defined based on a boiling range, such as a boiling range that includes at least 90 wt % of the fraction (T90 boiling point), and preferably at least 95 wt % of the fraction (T95 boiling point). For example, for many types of naphtha fractions, at least 90 wt % of the fraction, and preferably at least 95 wt %, can have a boiling point in the range of 85° F. (29° C.) to 350° F. (177° C.). For some heavier naphtha fractions, at least 90 wt % of the fraction, and preferably at least 95 wt %, can have a boiling point in the range of 85° F. (29° C.) to 400° F. (204° C.). For a kerosene fraction, at least 90 wt % of the fraction, and preferably at least 95 wt %, can have a boiling point in the range of 300° F. (149° C.) to 600° F. (288° C.). Alternatively, for a kerosene fraction targeted for some uses, such as jet fuel production, at least 90 wt % of the fraction, and preferably at least 95 wt %, can have a boiling point in the range of 300° F. (149° C.) to 550° F. (288° C.). For a diesel fraction, at least 90 wt % of the fraction, and preferably at least 95 wt %, can have a boiling point in the range of 400° F. (204° C.) to 750° F. (399° C.).

Typical gas oil fractions can include, for example, fractions with an initial boiling point of at least about 650° F. (343° C.), or at least about 700° F. (371° C.), or at least about 750° F. (399° C.). Alternatively, a gas oil fraction may be characterized using a T5 boiling point, such as a fraction with a T5 boiling point of at least about 650° F. (343° C.), or at least about 700° F. (371° C.), or at least about 750° F. (399° C.). In some aspects, the final boiling point of a gas oil fraction can be about 1150° F. (621° C.) or less, such as about 1100° F. (593° C.) or less, or about 1050° F. (566° C.) or less. Alternatively, a gas oil fraction may be characterized using a T95 boiling point, such as a fraction with a T95 boiling point of about 1150° F. (621° C.) or less, or about 1100° F. (593° C.) or less, or about 1050° F. (566° C.) or less. In still other aspects, a gas oil fraction can correspond to a lower boiling gas oil fraction, with a T95 boiling point or final boiling point of about 1000° F. (538° C.) or less, such as about 935° F. (500° C.) or less. An example of a suitable type of gas oil fraction is a wide cut vacuum gas oil (VGO), with a T5 boiling point of at least about 700° F. (371° C.) and a T95 boiling point of about 1100° F. or less, preferably a T95 boiling point of about 1000° F. (538° C.) or less.

Feedstocks

In various aspects, a hydroprocessed product is produced from a heavy oil feed component. Examples of heavy oils include, but are not limited to, heavy crude oils, distillation residues, deasphalted oils, heavy oils coming from catalytic treatment (such as heavy cycle bottom slurry oils from fluid catalytic cracking), thermal tars (such as oils from visbreaking, steam cracking, or similar thermal or non-catalytic processes), oils (such as bitumen) from oil sands and heavy oils derived from coal. In aspects where a feed includes a deasphalted oil, the deasphalted oil can be deasphalted using any convenient type of deasphalting solvent, such as a deasphalted oil derived from propane deasphalting, pentane deasphalting, or any other conventional solvent used for deasphalting, such as a $C_3$-$C_7$ alkane.

Heavy oil feedstocks can be liquid or semi-solid. Examples of heavy oils that can be hydroprocessed, treated or upgraded according to this invention include bitumens and residuum from refinery distillation processes, including atmospheric and vacuum distillation processes. Such heavy oils can have an initial boiling point of 650° F. (343° C.) or greater. Preferably, the heavy oils will have a 10% distillation point (T10) of at least 650° F. (343° C.), alternatively at least 660° F. (349° C.) or at least 750° F. (399° C.). In some aspects the 10% distillation point can be still greater, such as at least 900° F. (482° C.), or at least 950° F. (510° C.), or at least 975° F. (524° C.), or at least 1020° F. (549° C.) or at least 1050° F. (566° C.).

In addition to initial boiling points and/or 10% distillation points, other distillation points may also be useful in characterizing a feedstock. For example, a feedstock can be characterized based on the portion of the feedstock that boils above 1050° F. (566° C.). In some aspects, a feedstock can have a 70% distillation point (T70) of 1050° F. or greater, or a 60% distillation point (T60) of 1050° F. or greater, or a 50% distillation point (T50) of 1050° F. or greater, or a 40% distillation point (T40) of 1050° F. or greater.

Density, or weight per volume, of the heavy hydrocarbon can be determined according to ASTM D287-92 (2006) Standard Test Method for API Gravity of Crude Petroleum and Petroleum Products (Hydrometer Method), and is provided in terms of API gravity. In general, the higher the API gravity, the less dense the oil. API gravity is 20° or less in one aspect, 15° or less in another aspect, and 10° or less in another aspect.

Heavy oils can be high in metals. For example, the heavy oil can be high in total nickel, vanadium and iron contents. In one embodiment, the heavy oil will contain at least 0.00005 grams of Ni/V/Fe (50 ppm) or at least 0.0002 grams of Ni/V/Fe (200 ppm) per gram of heavy oil, on a total elemental basis of nickel, vanadium and iron. In other aspects, the heavy oil can contain at least about 500 wppm of nickel, vanadium, and iron, such as at least about 1000 wppm.

Contaminants such as nitrogen and sulfur are typically found in heavy oils, often in organically-bound form. Nitrogen content can range from about 50 wppm to about 10,000 wppm elemental nitrogen or more, based on total weight of the heavy hydrocarbon component. The nitrogen containing compounds can be present as basic or non-basic nitrogen species. Examples of basic nitrogen species include quinolines and substituted quinolines. Examples of non-basic nitrogen species include carbazoles and substituted carbazoles.

The invention is particularly suited to treating heavy oils containing at least 500 wppm sulfur, based on total weight of the heavy oil. Generally, the sulfur content of such heavy oils can range from about 500 wppm to about 100,000 wppm sulfur, or from about 1000 wppm to about 50,000 wppm, or from about 1000 wppm to about 30,000 wppm, based on total weight of the heavy component. Sulfur will usually be present as organically bound sulfur. Examples of such sulfur compounds include the class of heterocyclic sulfur compounds such as thiophenes, tetrahydrothiophenes, benzothiophenes and their higher homologs and analogs. Other organically bound sulfur compounds include aliphatic, naphthenic, and aromatic mercaptans, sulfides, and di- and polysulfides.

Heavy oils can be high in n-pentane asphaltenes and/or n-heptane asphaltenes, which are sometimes referred to as n-heptane insolubles (NHI). In some aspects, the heavy oil can contain at least about 5 wt % of n-pentane asphaltenes, or at least about 10 wt %, or at least 15 wt % n-pentane asphaltenes. Additionally or alternately, a heavy oil can contain at least about 5 wt % of n-heptane asphaltenes, or at least about 10 wt %, or at least about 15 wt %.

Still another method for characterizing a heavy oil feedstock is based on the Conradson carbon residue of the feedstock. The Conradson carbon residue of the feedstock can be at least about 5 wt %, such as at least about 10 wt % or at least about 20 wt %. Additionally or alternately, the Conradson carbon residue of the feedstock can be about 50 wt % or less, such as about 40 wt % or less or about 30 wt % or less.

In various aspects of the invention, reference may be made to one or more types of fractions generated during distillation of a petroleum feedstock. Such fractions may include naphtha fractions, kerosene fractions, diesel fractions, and vacuum gas oil fractions. Each of these types of fractions can be defined based on a boiling range, such as a boiling range that includes at least 90 wt % (T90) of the fraction, or at least 95 wt % (T95) of the fraction. For example, for many types of naphtha fractions, at least 90 wt % of the fraction, or at least 95 wt %, can have a boiling point in the range of 85° F. (29° C.) to 350° F. (177° C.). For some heavier naphtha fractions, at least 90 wt % of the fraction, or at least 95 wt %, can have a boiling point in the range of 85° F. (29° C.) to 400° F. (204° C.). For a kerosene fraction, at least 90 wt % of the fraction, or at least 95 wt %, can have a boiling point in the range of 300° F. (149° C.) to 600° F. (288° C.). Alternatively, for a kerosene fraction targeted for some uses, such as jet fuel production, at least 90 wt % of the fraction, or at least 95 wt %, can have a boiling point in the range of 300° F. (149° C.) to 550° F. (288° C.). For a diesel fraction, at least 90 wt % of the fraction, or at least 95 wt %, can have a boiling point in the range of 400° F. (204° C.) to 750° F. (399° C.).

Use of Promoted Slurry Catalysts for Improved Activity

Catalyst cost is another concern for slurry hydroconversion of heavy oil feeds. Mo-based slurry catalysts generally provide a higher activity than Fe-based slurry catalysts. However, due to the high cost of Mo-based catalysts, Fe-based slurry catalysts remain a viable alternative.

It has been discovered that a synergistic interaction between an Fe-based slurry catalyst and a promoting amount of a Mo-based catalyst can be achieved by using selected methods for forming the promoted catalyst or co-catalyst system. The promoted catalyst system can have an activity corresponding to a higher Mo concentration while using at least a portion of a low cost Fe-based catalyst.

The promoted catalyst system can be prepared by first dispersing or otherwise introducing an Mo-based catalyst precursor/concentrate into a hydrocarbonaceous medium, such as a whole crude oil or a crude oil fraction that is or includes a heavy/resid portion. The Mo-based catalyst precursor/concentrate includes Mo in a non-sulfided form, so that the Mo is not yet in a catalytic form. The Mo-based catalyst precursor/concentrate can be dispersed in the hydrocarbonaceous medium, such as by high shear mixing. In some embodiments, the Mo precursor/concentrate can be mixed with an Fe-based catalyst precursor/concentrate and either separately or co-sulfided to form a mixed metal precursor/concentrate, which can then be activated. In other embodiments, the Mo-based precursor/concentrate can be pre-sulfided before mixing with the Fe-based precursor/concentrate, which mixture can then be fully sulfided and then activated. In still other embodiments, the Mo-based precursor/concentrate can be pre-sulfided and pre-formed (pre-activated) before mixing with the Fe-based precursor/concentrate, which can then be fully sulfided and then fully activated. Varied sequences for formation of the sulfided catalyst can allow a reduced or minimized concentration of Mo to serve as a catalyst promoter for the larger amount of Fe catalyst. In some aspects, the promoted activity of the Fe catalyst within the promoted catalyst system can be greater than the activity of Mo catalyst.

In various aspects, the unexpected promotion benefit from the promoted catalyst system in heavy oil feedstock is obtained with or without using the promoted catalyst system concentrate and is derived from using a reduced or minimized amount of the Mo catalyst precursor/concentrate (and/or other Group VI metal catalyst precursor/concentrate). While Mo can be used as a catalyst, it has been discovered that additional Mo beyond a reduced or minimized amount serves primarily as a catalyst, rather than also providing the benefit of promoting the activity of a Group VIII metal catalyst. The amount of Mo catalyst precursor/concentrate or catalyst (on an Mo basis) can be about 250 wppm or less, about 230 wppm or less, or about 200 wppm or less, or about 175 wppm or less, or about 150 wppm or less, and/or at least 10 wppm, or at least 25 wppm, or at least 50 wppm, or at least about 75 wppm, or at least 100 wppm, based on the inclusion of the catalyst/system into/among a heavy oil feedstock to be hydroconverted. More generally, the amount of catalyst precursor/concentrate based on one or more Group VI metals (on a metal basis) can be 250 wppm or less, about 230 wppm or less, or about 200 wppm or less, or about 175 wppm or less, or about 150 wppm or less, and/or at least 10 wppm, or at least 25 wppm, or at least 50 wppm, or at least 75 wppm, or at least 100 wppm, again based on the inclusion of the catalyst/system into/among a heavy oil feedstock to be hydroconverted. It should be well understood that the hydrocarbonaceous material containing a heavy (oil)/resid fraction can be the same as or different from the to-be-hydroconverted heavy oil feedstock into which the catalyst/system is mixed.

Additionally or alternately, the synergistic promotion of the Group VIII metal can be achieved based on a catalyst or corresponding catalyst precursor/concentrate having a low ratio of Group VIII metal (such as Fe) to Group VI metal (such as Mo). In various aspects, the weight ratio of Group VIII metal to Group VI metal in the catalyst or catalyst precursor/concentrate (whether as is or based on the inclusion of the catalyst/system into/among a heavy oil feedstock to be hydroconverted) is at least about 5, or at least about 8, or at least about 10, or at least about 15, at least about 20, or at least about 25, and/or about 1000 or less, or about 750 or less, or about 500 or less, or about 250 or less, or about 100 or less, or about 50 or less, or about 30 or less, or about 26 or less, or about 20 or less. Other Group VIII non-noble metals include Ni and Co. Other Group VI metals include W.

The amount of Group VIII metal in a promoted catalyst system can be any convenient amount that provides a suitable ratio of Group VIII metal to Group VI metal. In various aspects, the amount of Group VIII metal (on a metal basis) in the catalyst or catalyst precursor/concentrate can be 500 wppm to 30,000 wppm, such as 500 wppm to 30,000 wppm, or 500 wppm to 20,000 wppm, or 500 wppm to 10,000 wppm, or 500 wppm to 5000 wppm, or 1000 wppm to 30,000 wppm, or 1000 wppm to 20,000 wppm, or 1000 wppm to 10,000 wppm, or 1000 wppm to 5000 wppm, or 2000 wppm to 30,000 wppm, or 2000 wppm to 20,000 wppm, or 2000 wppm to 10,000 wppm, or 2000 wppm to 5000 wppm, e.g., based on the inclusion of the catalyst/system into/among a heavy oil feedstock to be hydroconverted.

The Group VI metal and Group VIII metal catalyst precursors/concentrates can be prepared in any convenient manner. One option can be to use metal catalyst precursors/concentrates that are water soluble. An aqueous solution of the catalyst precursor/concentrate can then be dispersed in the feed for conversion. Any convenient method for dispersing the precursor/concentrate can be used. High shear mixing is an example of a suitable method for dispersing an aqueous solution in a heavy oil feed or other feed for slurry hydroconversion.

Due to the difference in boiling point between water and a typical heavy oil feed for slurry hydroconversion, the water from the solution can be removed during a drying step at a convenient temperature, such as 120° C. or less. Optionally, at least two separate drying steps can be used, with a drying step after introduction of the Group VI metal into the feed, and a second drying step after introduction of the Group VIII non-noble metal into the feed.

Examples of suitable precursors for the Group VIII metal can include, but are not limited to, various water soluble compounds or other (oil soluble or water soluble) salts of a Group VIII metal. Examples of counter-ions and/or ligands for the Group VIII metal can include, but are not limited to sulfate, carbonyl (carbon monoxide as a ligand), nitrate, and acetate. Iron pentacarbonyl—$Fe(CO)_5$—is an example of an oil-soluble compound with ligands as opposed to a group that would conventionally be viewed as a counterion. Other suitable counter-ions can include counter-ions composed primarily of C, O, and H, such as acetate or citrate. In some aspects, the counter-ion can be a non-sulfur-containing counter-ion. Examples of suitable precursors for the Group VI metal can include, but are not limited to, heteropolyacids based on the Group VI metal and other heteropolyanion compounds based on the Group VI metal.

In some alternative aspects, at least part of the benefit of promotion by Mo or another Group VIII metal can be achieved by using a non-sulfur-containing Group VIII catalyst precursor/concentrate with a pre-sulfided Mo catalyst (and/or other pre-sulfided Group VI metal catalyst). In such aspects, a pre-sulfided Mo catalyst/Group VI catalyst can be introduced into a feedstock by any convenient method. One option can be to perform a sulfidation process on the feed after dispersing an Mo-containing catalyst precursor/concentrate and/or other Group VI catalyst precursor/concentrate in the feed but before introducing the Group VIII metal catalyst precursor/concentrate. After forming the sulfided Group VI metal catalyst, the Group VIII metal catalyst precursor/concentrate can be introduced into the feed as described above. For non-sulfur-containing Group VIII metal catalyst precursors/concentrates, at least a portion of the promotion benefit can be achieved. By contrast, when a sulfur-containing Group VIII catalyst precursor/concentrate is used with a pre-formed, pre-sulfided Group VI catalyst, the combined catalyst system not only does not show a promoted activity effect, but may even have a lower activity than would be expected from the Group VI catalyst alone.

After dispersing a Group VIII non-noble metal catalyst precursor/concentrate and/or a Group VI metal catalyst precursor/concentrate in a feed, the catalyst precursors can be sulfided, for example, by exposing the feed to a treat gas stream containing both hydrogen and hydrogen sulfide. The amount of hydrogen sulfide in the treat gas stream can be from about 0.5 mole % to about 10 mole %, or at least about 2.0 mole %. The temperature for sulfidation can be similar to the temperature for slurry hydroconversion of the feed, such as about 350° C. to about 480° C., or about 400° C. to about 480° C. The hydrogen partial pressure during sulfidation can also be similar to the pressure during hydroconversion, and therefore can range from about 250 psig (1.7 MPag) to 3400 psig (23.4 MPag). The length of sulfidation can be any convenient amount of time and can typically be dependent on the conditions selected during sulfidation. Examples of sulfidation times can range from 0.01 hours to 150 hours, depending on the severity of the conditions and the percentage of time the catalyst is resident within the reactor as opposed to be resident within some other portion of the slurry hydroconversion system (such as the catalyst recovery loop).

After forming a sulfided promoted catalyst system, the feedstock can be treated under slurry hydroconversion conditions. The reaction conditions for slurry hydroconversion can be selected so that the net conversion of feed across all slurry hydroconversion reactors (if there is more than one arranged in series) is at least about 80%, such as at least about 85%, at least about 90%, or at least about 95%, optionally up to about 99%, or up to about 95%, or up to about 90%. For slurry hydroconversion, conversion is defined as conversion of compounds with boiling points greater than a conversion temperature, such as 975° F. (524° C.), to compounds with boiling points below the conversion temperature. Alternatively, the conversion temperature for defining the amount of conversion can be 1050° F. (566° C.). The portion of a heavy feed that is unconverted after slurry hydroconversion can be referred to as pitch or a bottoms fraction from the slurry hydroconversion.

A slurry hydroconversion process can generate a variety of products in the hydroconversion effluent. In addition to a pitch or bottoms fraction, a hydroconversion effluent can also include a gas phase product including light ends and contaminant gases ($H_2S$, $NH_3$), and one or more converted product fractions. The converted product fractions can have boiling ranges corresponding to one or more of the naphtha boiling range, the kerosene boiling range, the diesel boiling range, and/or the vacuum distillate boiling range.

After performing hydroconversion, the catalyst can optionally be recovered from a bottoms or pitch fraction formed during hydroconversion. Alternatively, in some optional aspects the catalyst can be recycled with a portion of the bottoms or pitch portion of the hydroconversion effluent to the slurry hydroconversion reactor. For example, a bottoms fraction of the slurry hydroconversion effluent can be separated using a hydrocyclone as a primary separator, and a portion of the (catalyst-rich) bottoms fraction can be recycled to the slurry hydroprocessing reactor for combination with additional fresh feed.

Slurry Hydroconversion

FIG. 1 shows an example of a reaction system suitable for performing slurry hydroconversion. The configuration in FIG. 1 is provided as an aid in understanding the general features of a slurry hydroconversion process. It should be understood that, unless otherwise specified, the conditions described in association with FIG. 1 can generally be applied to any convenient slurry hydroconversion configuration.

In FIG. 1, a heavy oil feedstock 105 is mixed with a catalyst 108 prior to entering one or more slurry hydroconversion reactors 110. For example, a promoted catalyst system as described above can be formed within a heavy oil feedstock and then introduced into one or more slurry hydroconversion reactors. The mixture of feedstock 105 and catalyst 108 can be heated prior to entering reactor 110 in order to achieve a desired temperature for the slurry hydroconversion reaction. A hydrogen stream 102 is also fed into reactor 110. Optionally, a portion of feedstock 105 can be mixed with hydrogen stream 102 prior to hydrogen stream 102 entering reactor 110. Optionally, feedstock 105 can also include a portion of recycled vacuum gas oil 155. Optionally, hydrogen stream 102 can also include a portion of recycled hydrogen 142.

The effluent from slurry hydroconversion reactor(s) 110 is passed into one or more separation stages. For example, an initial separation stage can be a high pressure, high temperature (HPHT) separator 122. A higher boiling portion from the HPHT separator 122 can be passed to a low pressure, high temperature (LPHT) separator 124 while a lower boiling (gas) portion from the HPHT separator 122 can be passed to a high temperature, low pressure (HTLP) separator 126. The higher boiling portion from the LPHT separator 124 can be passed into a fractionator 130. The lower boiling portion from LPHT separator 124 can be combined with the higher boiling portion from HPLT separator 126 and passed into a low pressure, low temperature (LPLT) separator 128. The lower boiling portion from HPLT separator 126 can be used as a recycled hydrogen stream 142, optionally after removal of gas phase contaminants from the stream such as $H_2S$ or $NH_3$. The lower boiling portion from LPLT separator 128 can be used as a flash gas or fuel gas 141. The higher boiling portion from LPLT separator 128 is also passed into fractionator 130.

In some configurations, HPHT separator 122 can operate at a temperature similar to the outlet temperature of the slurry hydroconversion reactor 110. This reduces the amount of energy required to operate the HPHT separator 122. However, this also means that both the lower boiling portion and the higher boiling portion from the HPHT separator 122 undergo the full range of distillation and further processing steps prior to any recycling of unconverted feed to reactor 110.

In an alternative configuration, the higher boiling portion from HPHT separator 122 is used as a recycle stream 118 that is added back into feed 105 for processing in reactor 110. In this type of alternative configuration, the effluent from reactor 110 can be heated to reduce the amount of converted material that is recycled via recycle stream 118. This allows the conditions in HPHT separator 122 to be separated from the reaction conditions in reactor 110.

In FIG. 1, fractionator 130 is shown as an atmospheric fractionator. The fractionator 130 can be used to form a plurality of product streams, such as a light ends or $C_4^-$ stream 143, one or more naphtha streams 145, one or more diesel and/or distillate (including kerosene) fuel streams 147, and a bottoms fraction. The bottoms fraction can then be passed into vacuum fractionator 135 to form, for example, a light vacuum gas oil 152, a heavy vacuum gas oil 154, and a bottoms or pitch fraction 156. Optionally, other types and/or more types of vacuum gas oil fractions can be generated from vacuum fractionator 135. The heavy vacuum gas oil fraction 154 can be at least partially used to form a recycle stream 155 for combination with heavy oil feed 105.

In a reaction system, slurry hydroconversion can be performed by processing a feed in one or more slurry hydroconversion reactors. The reaction conditions in a slurry hydroconversion reactor can vary based on the nature of the catalyst, the nature of the feed, the desired products, and/or the desired amount of conversion.

The reaction conditions within a slurry hydroconversion reactor can include a temperature of about 400° C. to about 480° C., such as at least about 425° C., or about 450° C. or less. Some types of slurry hydroconversion reactors are operated under high hydrogen partial pressure conditions, such as having a hydrogen partial pressure of about 1200 psig (8.3 MPag) to about 3400 psig (23.4 MPag), for example at least about 1500 psig (10.3 MPag), or at least about 2000 psig (13.8 MPag). Examples of hydrogen partial pressures can be about 1200 psig (8.3 MPag) to about 3000 psig (20.7 MPag), or about 1200 psig (8.3 MPag) to about 2500 psig (17.2 MPag), or about 1500 psig (10.3 MPag) to about 3400 psig (23.4 MPag), or about 1500 psig (10.3 MPag) to about 3000 psig (20.7 MPag), or about 1500 psig (8.3 MPag) to about 2500 psig (17.2 MPag), or about 2000 psig (13.8 MPag) to about 3400 psig (23.4 MPag), or about 2000 psig (13.8 MPag) to about 3000 psig (20.7 MPag). Since the catalyst is in slurry form within the feedstock, the space velocity for a slurry hydroconversion reactor can be characterized based on the volume of feed processed relative to the volume of the reactor used for processing the feed. Suitable space velocities for slurry hydroconversion can range, for example, from about 0.05 v/v/hr$^{-1}$ to about 5 v/v/hr$^{-1}$, such as about 0.1 v/v/hr$^{-1}$ to about 2 v/v/hr$^{-1}$.

The reaction conditions for slurry hydroconversion can be selected so that the net conversion of feed across all slurry hydroconversion reactors (if there is more than one arranged in series) is at least about 80%, such as at least about 90%, or at least about 95%. For slurry hydroconversion, conversion is defined as conversion of compounds with boiling points greater than a conversion temperature, such as 975° F. (524° C.), to compounds with boiling points below the conversion temperature. Alternatively, the conversion temperature for defining the amount of conversion can be 1050° F. (566° C.). The portion of a heavy feed that is unconverted after slurry hydroconversion can be referred to as pitch or a bottoms fraction from the slurry hydroconversion.

Figure 4:
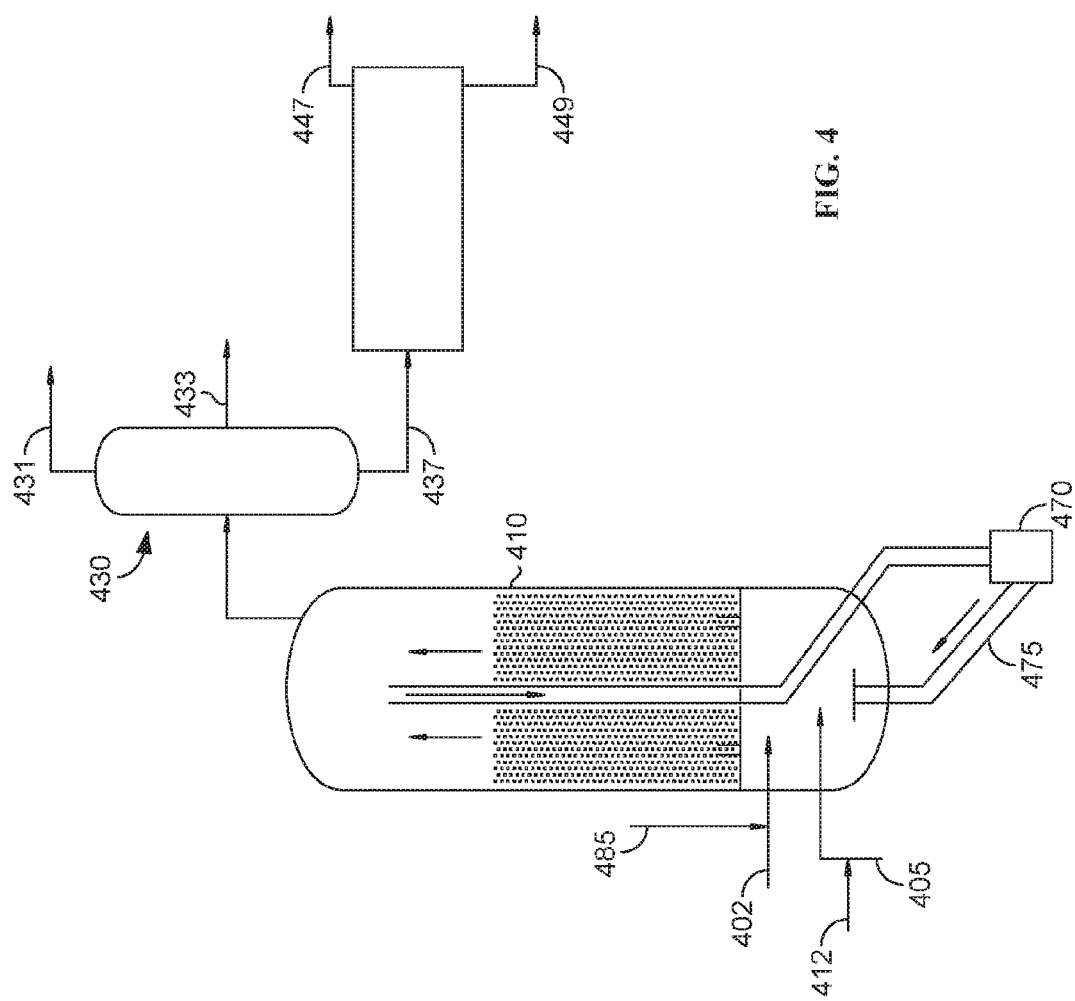
FIGS. 4-6 show examples of slurry hydroconversion reactor configurations.
Figure 5:
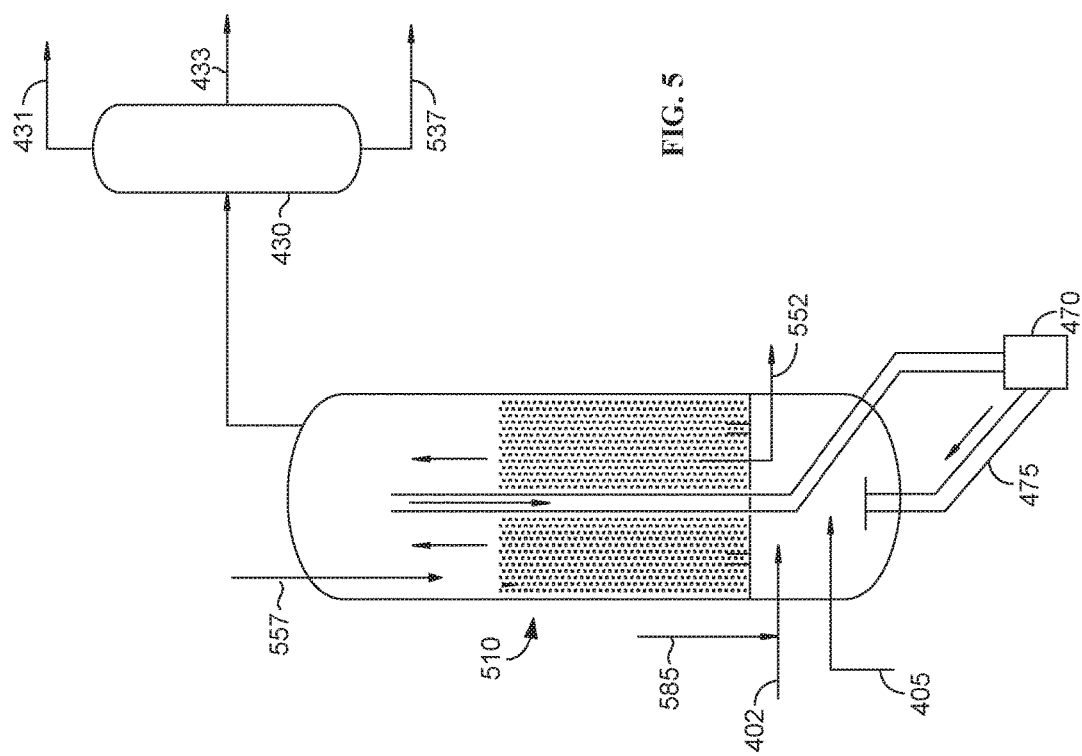
Figure 6:
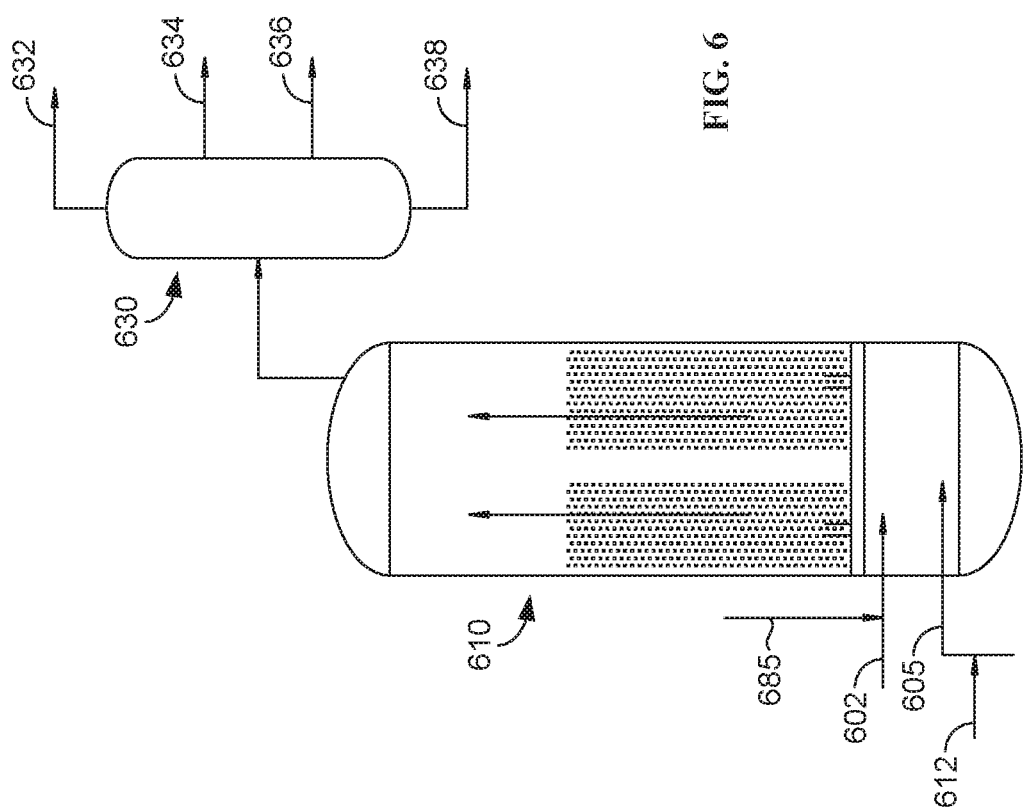

FIGS. 4 and 5 show examples of reaction system configurations for a slurry hydroconversion reactor using a high concentration of bulk and/or supported metal catalyst. FIG. 6 shows an example of a slurry hydroconversion reactor configuration for a conventional slurry catalyst.

In FIG. 4, a configuration is shown for performing slurry hydroconversion with recycle of a bulk and/or supported metal catalyst. In FIG. 4, a resid feed 405 is passed into a slurry hydroconversion reactor 410. Fresh or make-up catalyst 412 can be added to feed 405 prior to entering reactor 410. A recycle stream 485 of a vacuum gas oil fraction plus catalyst can also be introduced into the reactor 410. Hydrogen stream 402 for use in the reactor can be combined with recycle stream 485 and/or feed 405 (not shown) prior to entering the reactor. The feed 405 and recycled vacuum gas oil 485 can then be processed in reactor 410 under effective slurry hydroprocessing conditions to generate a slurry hydroprocessing effluent. In the reactor 410, catalyst that is not entrained with the catalyst can separate from the slurry hydroprocessing effluent prior to leaving the reactor. This portion of the catalyst can be recycled 475 to the reactor via a suitable pump, such as an ebullating pump 470. The slurry hydroprocessing effluent that exits from the reactor can be fractionated 430 to form at least a light ends portion 431, a fuels portion 433, and a bottoms fraction including entrained catalyst 437. Because a high activity hydrotreating catalyst is being used for upgrading, the fuels portion 433 after upgrading can have a sulfur content and/or a nitrogen content of about 100 wppm or less, such as about 50 wppm or less. The sulfur and nitrogen content of bottoms fraction 437 can also be substantially reduced relative to the initial feed 405. Additionally, it is noted that the bottoms 437 corresponds to a vacuum gas oil and/or resid type fraction. Due to the use of a high activity hydrotreating catalyst, the formation of slurry hydroprocessing pitch is minimized or avoided. A portion of the catalyst in the bottoms fraction 437 can be separated out as a catalyst purge stream 449. The bottoms fraction after separation 449, along with the remaining entrained catalyst, can then be used as recycled vacuum gas oil and catalyst stream 485. It is noted that since the vacuum gas oil fraction is a bottoms fraction, an atmospheric fractionator can be used to perform the separation shown in FIG. 4.

In FIG. 5, an alternative configuration is shown for addition and withdrawal of bulk and/or supported metal catalyst while reducing or minimizing product recycle. The configuration is similar to FIG. 4 but instead of recycling catalyst as part of a recycled vacuum gas oil, catalyst is retained in the reactor 510 by filtering the slurry hydroconversion effluent as it leaves the reactor 510. In FIG. 5, at least a portion of vacuum gas oil is recycled 585, but the recycled vacuum gas oil does not include catalyst. Instead, the catalyst recycle loop for reactor 510 involves removal or purge 552 of catalyst from the reactor. Catalyst is then reintroduced into the reactor, by addition to the feed 405 (not shown) or by direct introduction 557 to the reactor. The slurry hydroprocessing effluent is handled similarly after leaving the reactor 510, with a fractionator 430 used to form (at least) a light ends fraction 431, a fuels fraction 433, and a bottoms fraction 537. At least a portion of the bottoms fraction 537 can be used to form recycled vacuum gas oil 585.

FIG. 6 shows an alternative configuration for a conventional slurry hydroconversion catalyst along with recycle of vacuum gas oil to the reactor. In FIG. 6, feed 605 is fed into reactor 610. A conventional slurry hydroprocessing catalyst 612, such as an Fe or Mo based catalyst, is added to feed 605. A source of hydrogen 602 and a vacuum gas oil recycle 685 are also added to reactor 610. The effluent from slurry hydroprocessing reactor 610 is then fractionated 630 to form at least a light ends fraction 632, a fuels fraction 634, a vacuum gas oil fraction 636 for at least partial use as recycled vacuum gas oil 685, and a bottoms or pitch fraction 638. The slurry catalyst can be primarily contained in the pitch fraction 638. Because the pitch fraction 638 is formed separately from vacuum gas oil fraction 636, the nature of fractionator 630 can be a vacuum fractionator or another type of separator capable of forming a vacuum resid type fraction.

Cross Flow Filtration Reactor

In some alternative aspects, optionally in combination with use of a promoted catalyst system, slurry hydroconversion can be performed in a reaction system that includes cross-flow filtration. In cross-flow filtration the slurry solution or suspension flows parallel to the filter medium. The filtration product (i.e., permeate or filtrate) leaves the filtration module at right angles to the filter medium (i.e., the membrane). The traditional perpendicular flow filtration, where the flow of the suspension is directed at right angles to the filter medium and the permeate leaves the filter medium in the same direction, entails filter-cake build-up. Perpendicular filtration mode can be favored when the filter-cake is to be collected for the purpose of solids recovery. By contrast, cross-flow filtration is intended to prevent such filter-cake build-up. In some aspects, cross-flow filtration can be beneficial for improving or maximizing the recovery of the liquids while retaining the solid content of the system with a reduced or minimized deposit of solids on the filter medium.

Development of a cross-flow filtration system employs an inertial filter principle which allows the permeate to flow radially through the filter media at a relatively low face velocity as compared to that of the mainstream slurry flow in the axial direction. Particles entrained in the high velocity axial flow field are prevented from entering the porous media by the ballistic effect of particle inertia. It has been suggested that sub-micron particles penetrates the filter medium form a "dynamic membrane" or sub-micron layer which impedes further penetration of even smaller particles through the porous filter media. In many filtration applications, this filtration mechanism is valid for an axial velocity greater than about 4-6 m/s.

Various advantages of cross-flow filtration can be exploited to develop an efficient method to continuously separate upgraded oil from nano-catalyst particles while retaining the catalyst loading of the slurry in the reactor to maintain the steady-state conversion. To minimize the degree of membrane surface fouling in continuous operation, a constant permeate flux-maintenance procedure can be used. The constant permeate flux maintenance procedure can ensure that the cross-flow filtration module operates at or near a desired trans-membrane pressure (TMP) while maintaining the desired permeate flux.

Figure 2:
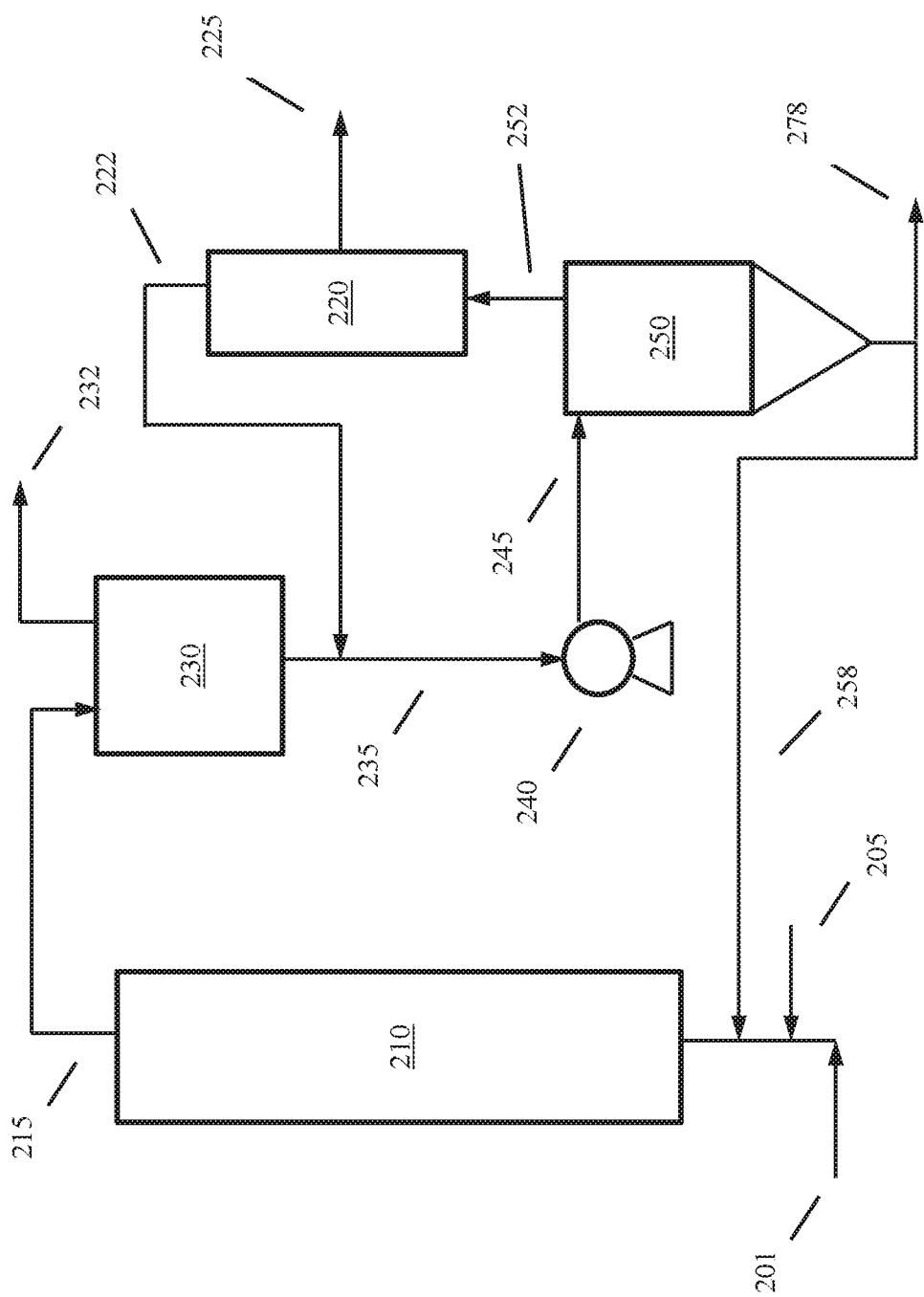
FIG. 2 shows an example of a slurry reaction system that includes a cross-flow filter system.

FIG. 2 shows an example of a reaction system for slurry hydroprocessing that includes a cross-flow filter. In FIG. 2, a modified slurry bubble column reactor 210 can be used with a cross-flow filter 220 element placed parallel to the down-comer slurry recirculation line 235 of the reaction system. Hydrogen 201 is fed (distributed by a sparger near the bottom of the reactor) and passes continuously through the reactor 210. Hydrocarbon feed 205 (along with fresh or recycled catalyst slurry) also enters to the reactor at the bottom. In FIG. 2, the product slurry stream 215 exits at the top of the reactor and passes through an overhead gas/liquid separator 230, where the slurry is disengaged from the gas phase. Vapor products and unreacted hydrogen 232 exit the gas/liquid separator and can be subsequently handled in any convenient manner. For example, a condenser can be used to separate out unreacted hydrogen from vapor hydrocarbon products that can be condensed. The condensed vapor products can be collected for subsequent use while the unreacted hydrogen can be recycled back to the reactor. The down-comer 235 from the gas/liquid separator 230, which collects the liquid slurry product, is connected to the suction side of a pump 240, such as moyno-type (progressive cavity) pump. The pump discharge 245 is connected to a primary separation device 250, such as a hydrocyclone. A catalyst-rich stream 258 (i.e., fraction of bottom stream from the primary separation device) is recycled to the reactor vessel while the lean catalyst/slurry stream 252 (i.e., top stream from the primary separation device) is diverted to a secondary filtration loop. Optionally, the fraction of clarified slurry 252 entering the secondary loop can be controlled by a throttle valve (not shown). Quantifying the secondary flow can be valuable, as the slurry velocity can impact performance in cross-flow filtration. Hence, the secondary slurry flow rate can be measured, for example, by a coriolis flow meter. Fine separation of the clarified slurry 252 is achieved by the cross-flow filter element 220, resulting in additional liquid product 225. A portion 222 of the liquid entering cross-flow filter element 220 will typically remain on the retentate side of the filter and can be recycled for additional passage through the separator 250 and filter element 220. A small fraction 278 of catalyst-slurry stream from bottom of the primary separation device (for example, 1-5 wt %) is purged for catalyst regeneration, such as regeneration to restore activity lost due to any catalyst deactivation/poisoning. A fresh make-up catalyst stream can be continuously added with feed oil 205 to account for the loss due to catalyst purge and to maintain a constant catalyst level in the reactor.

Contrary to the conventional cross-flow filtration process, a reaction configuration such as the configuration shown in FIG. 2 can operate at a slurry flow rate below the critical velocity (4-6 m/s), thereby forcing a filter cake of solids to form (between the filter media and the slurry flow) which would act as a pre-filter layer. Operation below the critical velocity can be advantageous as it offers simultaneous utilization of both inertial and filter-cake mechanisms. However, if the filter cake is allowed to grow uncontrollably it can cause a blockage in the down-corner flow and the whole process would cease to operate. Hence, the axial velocity of the slurry can be maintained at a level such that an adequate shear force exists along the filter media to maintain the depth of the filter cake to produce the optimum permeate flux-transmembrane pressure (TMP) relationship without any blockage of the filter media.

In some aspects, the axial velocity through the cross-flow unit can be maintained at about 1-5 m/s (preferably 2-4 m/s) to minimize the thickness of the boundary layer of particles near the membrane surface. The upgraded oil (i.e., permeate) flow from the filter is limited by a control valve actuated by a level controller. Hence, a roughly constant inventory of slurry can be maintained within the reactor. The flux of the clean permeate through the cross-flow filtration module is controlled by the pressure in the permeate letdown vessel. Therefore, TMP is fixed for a given filtration event. The TMP can be changed manually by varying the of the permeate letdown vessel. In some aspects, the filter unit can be bypassed in order to change filters while the slurry continues its recirculation path.

An active flux maintenance or filter membrane cleaning procedure can be used for the permeate side of the cross-flow filtration module. For example, a flux maintenance system can be provided that back-flushes the filter membrane with a piston pump that is triggered by a computer-controlled timer. An example of a suitable back-flush fluid is cleaned permeate that can be stored in a vessel located near the suction side of the piston pump. The frequency of application of this active flux-maintenance procedure can be, for example, 2 seconds of back-flush per 30 minute filter cycle.

Additionally or alternately, a passive permeate flux-maintenance technique can be used for disrupting the permeate flow while allowing the retentate slurry to circulate axially through the cross-flow filter module. For example, a valve on the permeate side of the membrane can be closed to prevent flow across the membrane. This type of procedure can allow inertial lift of the particles deposited on the membrane surface in the absence of any permeate convection through the membrane surface. The approach of switching the permeate flow off momentarily, either with a regular frequency or based on detection of a pressure fluctuation, would be simple, and thus likely more economical to implement as compared to the active flux maintenance technique. In some aspects, the frequency of application of the passive permeate flux maintenance procedure can be 1 hour off per filter-day cycle in combination with 30 s off per 30 min filter cycle. In aspects where passive filter maintenance is combined with active filter maintenance, the cycles or other triggers for starting either an active or passive cycle can be selected in any convenient manner, including selection of cycles independently or in a manner where the passive and active cycles are linked.

Oxidative Ring Opening

In some alternative aspects, optionally including some aspects where slurry hydroconversion is performed using a promoted catalyst system, the pitch or bottoms generated during slurry hydroprocessing can be treated using oxidative ring opening.

Oxidative ring opening relates to a process where atmospheric and/or vacuum resids can be converted by a combination of mild slurry hydroprocessing and oxidative ring opening (ORO) for maximizing fuels and chemical production from resids. In some aspects, application of mild slurry hydroprocessing to resids can enable selective removal of high value aliphatic groups from the resids, leaving behind pitch or unconverted resid rich in aromatic cores with fused 5-ring, 4-ring or 3-ring aromatics. ORO enables transformation of these fused polyaromatics into 1- and 2-ring aromatics with oxygen moieties which can be either maleic anhydride, phthalic anhydride or other high value chemicals.

ORO can provide a lower cost route to upgrading vacuum resids to distillable liquids (for fuels/lubes/chemicals) and oxygenated 1- and 2-ring aromatics. For example, ORO of aromatic cores can enable a hydrogen free route to remove metals and to convert fused rings to oxygenated 1- and 2-rings aromatics providing higher value. This route may make it easier to crack into and convert multi-ring fused aromatics, thus requiring less total $H_2$ for complete resid conversion than the slurry hydroprocessing by itself.

Both mild slurry hydroprocessing and ORO are low severity conversion/upgrading processes, with operating pressures of about 250 psi to about 1000 psi for mild slurry hydroprocessing and <100 psi for ORO respectively. The combination of mild slurry hydroprocessing and ORO can result in almost complete conversion of resids to higher value added products.

Pitch generated from conventional slurry hydroprocessing (>1000 psi pressure) can also be upgraded by ORO to generate 1- and 2-ring aromatics with oxygen moieties.

Figure 3:
FIG. 3 shows an example of results from treating slurry hydroconversion pitch using an oxidative ring opening process.
Figure 3:
Figure 3:

FIG. 3 shows results from $^{13}C$ solid state NMR of a slurry hydroconversion pitch fraction before and after performing ORO on a pitch fraction. Pitch obtained from mild slurry hydroprocessing of atmospheric resid was subjected to oxidative ring opening using a biphasic system using 30% $H_2O_2$ in $H_2O$ as oxidant and $H_2WO_4$ as the catalyst. The properties of the pitch before and after ORO are presented as FIG. 3. As seen from the data, ORO is effective in selectively ring opening the aromatics as seen from the aromatic and aliphatic content. Aromatic ring size of the pitch after oxidation is reduced as evident from the aromatic cluster size value. This shows the effectiveness of ORO towards aromatic cores.

Figure 7:
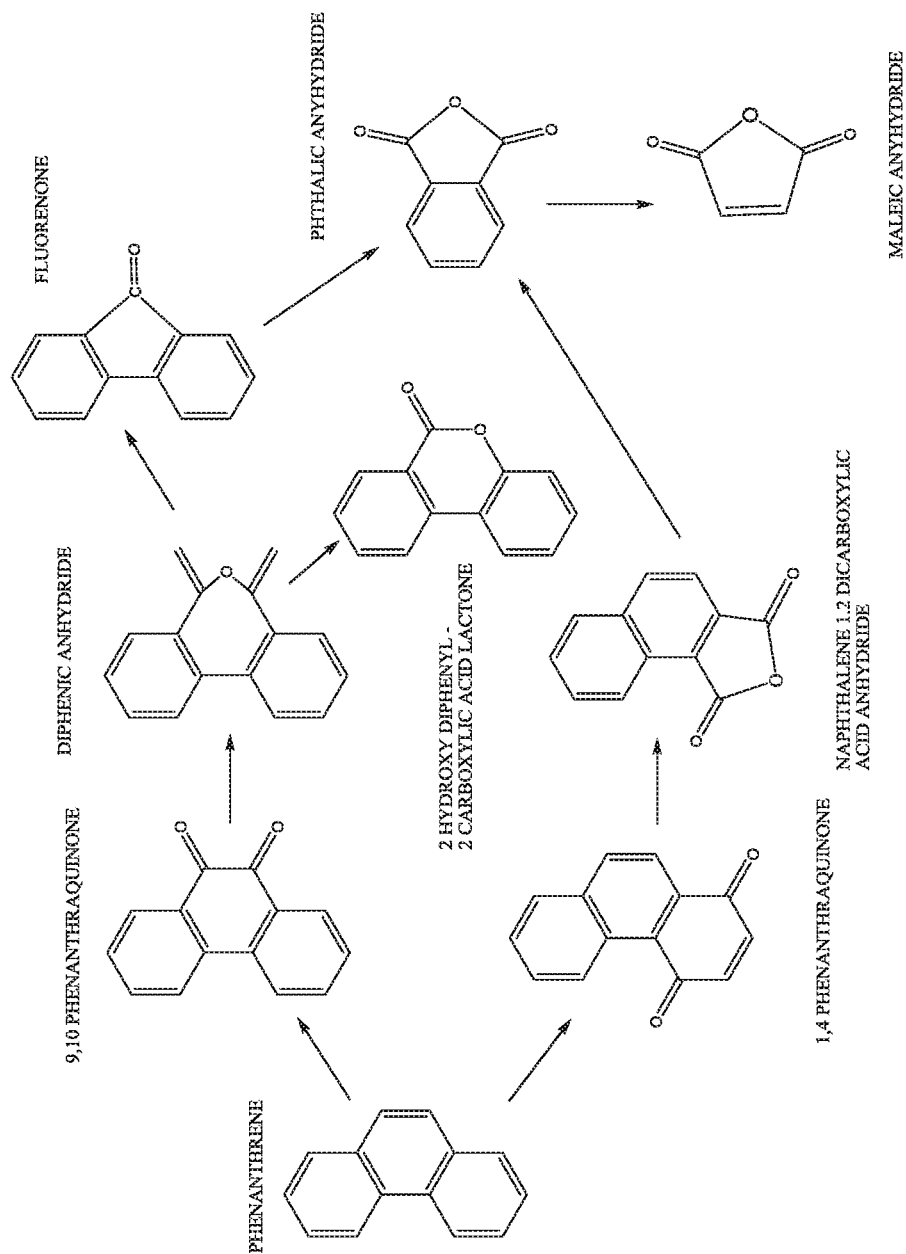
FIGS. 7 and 8 show examples of potential reaction products from oxidative ring opening of slurry hydroconversion pitch.

In some aspects, ORO selectivity can be controlled based on the desired products. FIG. 7 below shows possible oxidation routes starting with a 3-ring aromatic compound. It is believed that similar chemistry applies to other 4 or 5+ polyaromatic rings as well.

Figure 8:
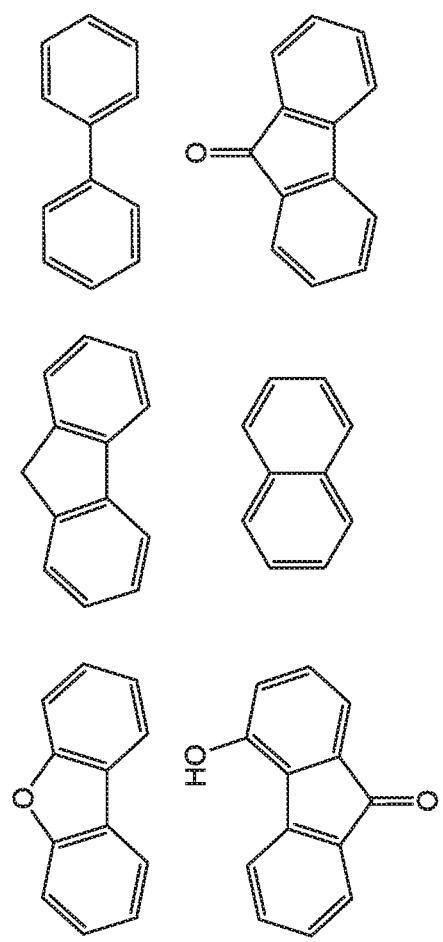

In addition to biphasic system, ORO can also be realized using air and heterogeneous catalyst, such as vanadium oxide. Phenanthrene oxidation was carried out in a batch reactor at 770° F. with 500 psi of air (initial charge at room temperature with no continuous flow) in presence of steam. Phenanthrene:oxygen:steam molar ratio employed in the process was 1:5:10. Products obtained by analysis of product by GC-MS (Gas Chromatograph-Mass Spectrometry) are presented as FIG. 8. Products obtained show that controlled oxidation can enable generation of aromatics with reduced ring size or oxygenated aromatic ring cores of higher value.

Additional Embodiments

Embodiment 1

A method for forming a slurry catalyst, comprising: dispersing a first catalyst precursor/concentrate comprising a Group VIII non-noble metal and a second catalyst precursor/concentrate comprising a Group VI metal in a hydrocarbonaceous material comprising a heavy oil (resid) fraction, an amount of the Group VI metal in the second catalyst precursor/concentrate in the hydrocarbonaceous material being about 250 wppm or less, based on the inclusion of the catalyst/system into/among a heavy oil feedstock to be hydroconverted, a weight ratio of the Group VIII non-noble metal in the first catalyst precursor/concentrate to the Group VI metal in the second catalyst precursor/concentrate in the hydrocarbonaceous material being at least about 10; sulfiding the first catalyst precursor/concentrate and the second catalyst precursor/concentrate to form a sulfided catalyst system; and optionally contacting the sulfided catalyst system with hydrogen gas and a sulfur source comprising hydrogen sulfide and/or elemental sulfur to form an activated catalyst system.

Embodiment 2

The method of Embodiment 1, wherein the second catalyst precursor/concentrate comprises phosphomolybdic acid and/or a different molybdenum heteropolyacid.

Embodiment 3

A method for forming a slurry catalyst, comprising: dispersing a first non-sulfur-containing catalyst precursor/concentrate comprising a Group VIII non-noble metal in a hydrocarbonaceous material comprising a heavy oil fraction, the feedstock further comprising a sulfided Group VI metal catalyst, an amount of the Group VI metal in the sulfided Group VI metal catalyst in the hydrocarbonaceous material being about 250 wppm or less, based on the inclusion of the catalyst/system into/among a heavy oil feedstock to be hydroconverted; sulfiding the first catalyst precursor/concentrate to form a sulfided catalyst system; and optionally contacting the sulfided catalyst system with hydrogen gas and a sulfur source comprising hydrogen sulfide and/or elemental sulfur to form an activated catalyst system, wherein a weight ratio of the Group VIII non-noble metal to the Group VI metal in the sulfided catalyst system is at least about 10.

Embodiment 4

The method of any of the above embodiments, wherein the hydrocarbonaceous material comprises a heavy oil feedstock having a 10% distillation point of at least about 650° F. (343° C.), or at least about 900° F. (482° C.).

Embodiment 5

The method of any of the above embodiments, wherein the Group VIII non-noble metal is Fe, or wherein the Group VI metal is Mo, or a combination thereof.

Embodiment 6

The method of any of the above embodiments, wherein the Group VIII non-noble metal catalyst precursor/concentrate comprises a water-soluble precursor/concentrate; or wherein the Group VIII non-noble metal catalyst precursor/concentrate comprises a counter-ion or ligand comprising sulfate, nitrate, acetate, citrate, carbonyl (carbon monoxide as a ligand); or a combination thereof.

Embodiment 7

The method of any of the above embodiments, wherein dispersing the first catalyst precursor/concentrate in the hydrocarbonaceous material comprises dispersing an aqueous solution of the first catalyst precursor/concentrate in the hydrocarbonaceous material, or wherein dispersing the second catalyst precursor/concentrate in the hydrocarbonaceous material comprises dispersing an aqueous solution of the second catalyst precursor/concentrate in the hydrocarbonaceous material, or a combination thereof.

Embodiment 8

The method of Embodiment 7, further comprising heating the hydrocarbonaceous material, after dispersing the first catalyst precursor/concentrate but prior to sulfiding the first catalyst precursor/concentrate, to a temperature of about 150° C. or less or about 120° C. or less to remove at least a portion of water present in the hydrocarbonaceous material.

Embodiment 9

The method of any of the above embodiments, wherein an effective concentration of Group VI metal for the sulfided catalyst system in the hydrocarbonaceous material is at least twice the amount of the Group VI metal in the sulfided catalyst system.

Embodiment 10

The method of any of the above embodiments, wherein an amount of the Group VIII non-noble metal in the sulfided catalyst system is about 500 wppm to about 30,000 wppm, or at least about 1000 wppm, or at least about 2000 wppm, and/or about 20,000 wppm or less, or about 10,000 wppm or less, based on inclusion of the catalyst/system into a heavy oil feedstock to be hydroconverted.

Embodiment 11

The method of any of the above embodiments, wherein the amount of the Group VI metal in the second catalyst precursor/concentrate in the hydrocarbonaceous material and/or in the sulfided catalyst system in the hydrocarbonaceous material is about 200 wppm or less, or about 175 wppm or less, or about 150 wppm or less, and/or at least about 10 wppm, or at least about 25 wppm, or at least about 50 wppm, or at least about 75 wppm, based on inclusion of the catalyst/system into a heavy oil feedstock to be hydroconverted; or wherein a weight ratio of the Group VIII non-noble metal to the Group VI metal in the sulfided catalyst system is at least about 15, or at least about 20, or at least about 25, and/or about 500 or less, or about 250 or less, or about 100 or less, or about 75 or less, or about 50 or less, or about 30 or less, or about 26 or less, or about 25 or less, or about 20 or less; or a combination thereof (such as about 30 or less).

Embodiment 12

The method of any of the above embodiments, wherein the conditions for sulfiding the first catalyst precursor/concentrate and/or the second catalyst precursor/concentrate comprise a hydrogen sulfide content in a hydrogen-containing treat gas stream of about 0.5 mole % to about 10 mole %, or at least about 2.0 mole %; a temperature of about 350° C. to about 480° C., or about 400° C. to about 480° C.; and a hydrogen partial pressure of about 250 psig (1.7 MPag) to 3400 psig (23.4 MPag).

Embodiment 13

The method of any of the above embodiments, further comprising hydroprocessing a feedstock under effective slurry hydroconversion conditions to form at least a converted fraction and a pitch fraction, at least a portion of the pitch fraction optionally being recycled for exposure to the effective slurry hydroconversion conditions.

Embodiment 14

The method of Embodiment 13, wherein the effective slurry hydroconversion conditions comprise a temperature of about 400° C. to about 480° C., or at least about 425° C., and/or about 450° C. or less; a hydrogen partial pressure of about 250 psig (1.7 MPag) to about 3400 psig (23.4 MPag), or at least about 500 psig (3.4 MPag), or at least about 1200 psig (8.3 MPag), or at least about 1500 psig (10.3 MPag), or at least about 2000 psig (13.8 MPag), and/or about 3000 psig (20.7 MPag) or less, or about 2500 psig (17.2 MPag) or less, or about 2000 psig (13.8 MPag) or less, or about 1000 psig (6.9 MPag) or less; and a space velocity of about 0.05 v/v/hr$^{-1}$ to about 5 v/v/hr$^{-1}$, or at least about 0.1 v/v/hr$^{-1}$, and/or about 2 v/v/hr$^{-1}$ or less.

Embodiment 15

The method of any of Embodiments 13-14, wherein the sulfided catalyst is separated from at least one of the converted fraction and the pitch fraction using a cross-flow filter.

Embodiment 16

The method of any of Embodiments 13-15, wherein at least a portion of the pitch fraction is exposed to oxidative ring opening conditions to form an oxidized pitch fraction.

Embodiment 17

The method of any of Embodiments 13-16, wherein the hydrocarbonaceous material comprises one or more of heavy crude oils, distillation residues, deasphalted oils, heavy oils coming from catalytic treatment (such as heavy cycle bottom slurry oils from fluid catalytic cracking), thermal tars (such as oils from visbreaking, steam cracking, or similar thermal or non-catalytic processes), oils (such as bitumen) from oil sands, and heavy oils derived from coal.

Embodiment 18

A sulfided catalyst system formed by the process of any of Embodiments 1-17.

EXAMPLES

In these Examples, the yield of toluene insolubles (TI) can be obtained by diluting a weighed sample of a noted volume (e.g., the hydroconversion product from the reactor at end-of-run) with approximately three volumes of toluene at room temperature (~20-25° C.). The diluted sample can be stirred until well-mixed (e.g., using a magnetic stirrer) and then filtered over a #2-grade tared Whatman filter paper using a Buchner funnel fitted to a filtration flask under vacuum (approximately −15 inches of mercury pressure). Any solids still on the filter paper can then be washed again with toluene until the residual solids were essentially water white, at which point the solids and filter paper can be transferred to a vacuum oven (approximately −25 inches of mercury pressure) and dried for about 30 minutes at about 176° F. The weight of the solids can be compared to the weight of the original sample to obtain the toluene insolubles yield (in wt %).

Also in these Examples, the hot oil insoluble solids (OI) can be obtained by filtering a weighed sample of a noted volume (e.g., hot reactor oil) at about 250° F. over a dry #2-grade tared Whatman filter paper in an inert gas (e.g., nitrogen, helium, and/or argon) purged vacuum oven (under approximately −15 inches of mercury pressure). In some cases, the vacuum filtration can take as much as ~1 hour. The filter cake can be removed from the oven and allowed to cool to approximately room temperature, at which point the weight of the filtrate dry solids can be compared to the weight of the original sample to obtain the hot oil insolubles solids yield (in wt %). Thereafter the filtrate can be washed with approximately three volumes of toluene until the residual solids were essentially water white and re-filtered in a new filtration flask under vacuum (approximately −15 inches of mercury pressure). The weight of the washed hot oil solids can be compared to the weight of the original sample to obtain the toluene reject (TR) yield (in wt %).

Examples 1-5

FIG. 9 shows examples of the activity benefits of using a co-catalyst for slurry hydroconversion. The data in FIG. 9 was generated based on slurry hydroconversion of a resid feed for ~180 minutes at a pressure of about 2100 psig (~14.5 MPag). Hydrogen was provided at ~0.36 L/min of $H_2$ as part of a hydrogen stream that contained ~6.0 mol % of $H_2S$. The initial reaction temperature was ~443° C. The concentrations of catalytic metal in FIG. 9 refer to the concentrations of the metals themselves, as opposed to the concentrations of the corresponding metal salts.

As a comparison, at roughly the specified reaction conditions, ~180 wppm of Mo as a slurry catalyst resulted in approximately 90% conversion of the feedstock while creating ~3.5 wt % of pitch, coke, and/or other toluene insolubles. As another comparison, use of ~1830 wppm of Fe as a catalyst under similar conditions created ~7.4 wt % of pitch, coke, and/or other toluene insolubles.

FIG. 9 shows results from use of five different catalyst systems as a slurry hydroprocessing catalyst. Catalyst systems A and B correspond to use of iron pentacarbonyl—Fe$(CO)_5$—as the iron precursor. Catalyst systems C, D, and E correspond to use of ferrous sulfate—$FeSO_4$—as the iron precursor. All five catalyst systems correspond to use of ~5000 wppm of concentrated phosphomolybdic acid (PMA) as the molybdenum precursor.

Catalyst systems A and C correspond to catalyst systems where the Mo precursor was sulfided prior to introducing the Group VIII metal catalyst precursor. Catalyst systems B, D, and E correspond to catalyst systems where the Mo precursor (phosphomolybdic acid) was sulfided during the same process as the Group VIII metal precursor.

In each of catalyst systems A-E, the Mo source was phosphomolybdic acid (PMA), and an Mo concentrate precursor was made by dispersing an aqueous solution of the PMA in a whole crude oil at about 70-90° C. under high shear (~1500 rpm mixing) in plug flow conditions, after which the dispersion is dried at ~135° C. in streaming inert gas (e.g., nitrogen) to form the Mo concentrate precursor. The Mo concentrate precursor was then sulfided in the presence of $H_2S$ or elemental sulfur (in the case of $H_2S$, at about 100-170° C. under about 35-50 psig pressure while stirring at about 500 rpm) to form a pre-sulfided Mo precursor. In catalyst systems A and C, the pre-sulfided Mo precursor was then activated by a further treatment in the presence of $H_2S/H_2$ (e.g., ~6.6 wt % hydrogen sulfide in hydrogen) at about 600-725° F. for about 5 minutes to 2 hours, thus forming a pre-sulfided, pre-formed Mo precursor. In each of catalyst systems A-E, the iron source was dispersed as an aqueous solution at about 70-90° C. under high shear (~1500 rpm mixing) with whole crude oil and either the pre-sulfided, pre-formed Mo precursor (systems A and C) or the pre-sulfided Mo precursor (systems B, D, and E) to form the mixed metal catalyst system. In catalyst systems B, D, and E, the mixed metal catalyst system was then further dried to remove water by exposure to inert gas (e.g., dry nitrogen) at about 300° F., and then subject to the aforementioned activation procedure. Thereafter, in all catalyst systems, a sufficient quantity of the formed catalyst system was introduced into the feed to achieve the metal concentrations shown in FIG. 9. The feed corresponded to a ~975° F.+ bottoms from a heavy oil. The conversion of the bottoms relative to ~975° F. was ~87-90% in the results shown in FIG. 9.

Catalyst system A corresponds to a pre-sulfided Mo catalyst with a non-sulfur-containing iron precursor. The catalyst system corresponded to about 3000 wppm of Fe and ~116 wppm of Mo. As shown in FIG. 9, the catalyst system reduced the toluene insolubles in the effluent to about 1.9 wt %. The equivalent amount of Mo needed to achieve this level of toluene insolubles, based on comparison with other runs, would be about 230 wppm. Thus, the effective amount of Mo for catalyst system A was more than twice the amount of Mo in the catalyst system.

For catalyst system B, phosphomolybdic acid was sulfided during the same sulfiding step as the iron catalyst precursor. This resulted in a slight increase in activity at the same amount of Mo in the catalyst system. As shown in FIG. 9, catalyst system B had an activity comparable to ~250 wppm of Mo even though only ~116 wppm was present in the catalyst system.

For catalyst system C, a pre-sulfided Mo catalyst was used in combination with an iron catalyst precursor that contained sulfur. Unlike catalyst system A, no activity benefit was observed by combining the two types of catalysts. In fact, the activity for catalyst system C appeared to be lower than just the ~170 wppm of Mo in the catalyst system.

By contrast, in catalyst systems D and E, sulfiding the Mo catalyst precursor during the same sulfidation process as the iron sulfate precursor resulted in an effective activity corresponding to ~270 wppm of Mo. It is noted that ~170-174 wppm of Mo was used in these catalyst systems, so more than half of the apparent activity appears to correspond to the activity from the Mo, as opposed to promotion of the Fe.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method for forming a slurry catalyst, comprising:
dispersing a first catalyst precursor comprising iron and a second catalyst precursor comprising molybdenum in a hydrocarbonaceous material comprising a heavy oil fraction, an amount of molybdenum in the second catalyst precursor in the hydrocarbonaceous material being about 250 wppm or less, based on inclusion of the catalyst/system into a heavy oil feedstock to be hydroconverted, a weight ratio of the iron in the first catalyst precursor to the molybdenum in the second catalyst precursor in the hydrocarbonaceous material being at least 10; wherein dispersing the first catalyst precursor in the hydrocarbonaceous material comprises dispersing an aqueous solution of the first catalyst precursor in the hydrocarbonaceous material, or wherein dispersing the second catalyst precursor in the hydrocarbonaceous material comprises dispersing an aqueous solution of the second catalyst precursor in the hydrocarbonaceous material, or a combination thereof, thereby forming a first and/or a second catalyst precursor concentrate; and
sulfiding the first catalyst precursor and the second catalyst precursor to form a sulfided catalyst system.

2. The method of claim 1, wherein the second catalyst precursor comprises phosphomolybdic acid and/or a different molybdenum heteropolyacid.

3. The method of claim 1, wherein the iron catalyst precursor comprises a water-soluble precursor; or wherein the iron catalyst precursor comprises a counter-ion or ligand comprising sulfate, nitrate, acetate, citrate, carbonyl (carbon monoxide as a ligand); or a combination thereof.

4. The method of claim 1, further comprising heating the hydrocarbonaceous material, after dispersing the first catalyst precursor but prior to sulfiding the first catalyst precursor, to a temperature of about 150° C. or less to remove at least a portion of water present in the hydrocarbonaceous material.

5. The method of claim 1, wherein an amount of the iron in the sulfided catalyst system is about 500 wppm to about 30,000 wppm, based on inclusion of the catalyst/system into a heavy oil feedstock to be hydroconverted.

6. The method of claim 1, wherein at least one of a) the amount of the molybdenum in the second catalyst precursor in the feedstock is about 150 wppm or less; b) an amount of the molybdenum in the sulfided catalyst system is about 150 wppm or less; c) a weight ratio of the iron to the molybdenum in the sulfided catalyst system is about 30 or less; or d) a combination thereof.

7. The method of claim 1, further comprising contacting the sulfided catalyst system with hydrogen gas and a sulfur source comprising hydrogen sulfide and/or elemental sulfur to form an activated catalyst system.

8. The method of claim 1, further comprising hydroprocessing a feedstock under effective slurry hydroconversion conditions to form at least a converted fraction and a pitch fraction, at least a portion of the pitch fraction optionally being recycled for exposure to the effective slurry hydroconversion conditions.

9. The method of claim 8, wherein the effective slurry hydroconversion conditions comprise a temperature of about 400° C. to about 480° C.; a hydrogen partial pressure of about 250 psig (1.7 MPag) to about 3400 psig (23.4 MPag); and a space velocity of about 0.05 v/v/hr$^{-1}$ to about 5 v/v/hr$^{-1}$.

10. The method of claim 8, wherein the sulfided catalyst is separated from at least one of the converted fraction and the pitch fraction using a cross-flow filter.

11. The method of claim 8, wherein at least a portion of the pitch fraction is exposed to oxidative ring opening conditions to form an oxidized pitch fraction.

12. A method for forming a slurry catalyst, comprising:
dispersing a first non-sulfur-containing catalyst precursor comprising iron in a hydrocarbonaceous material comprising a heavy oil fraction, the hydrocarbonaceous material further comprising a sulfided molybdenum catalyst, an amount of molybdenum in the sulfided molybdenum catalyst in the hydrocarbonaceous material being about 250 wppm or less, based on inclusion of the catalyst/system into a heavy oil feedstock to be hydroconverted; and
sulfiding the first catalyst precursor to form a sulfided catalyst system, and
contacting the sulfided catalyst system with hydrogen gas and a sulfur source comprising hydrogen sulfide and/or elemental sulfur to form an activated catalyst system,
wherein a weight ratio of the iron to the molybdenum in the sulfided catalyst system is at least about 10.

13. The method of claim 12, wherein an amount of the iron in the sulfided catalyst system is about 500 wppm to about 30,000 wppm.

14. The method of claim 12, wherein a weight ratio of the iron to the molybdenum in the sulfided catalyst system is about 30 or less.

15. The method of claim 12, further comprising hydroprocessing a feedstock under effective slurry hydroconversion conditions to form at least a converted fraction and a pitch fraction.

16. An activated catalyst system formed by a method comprising:
dispersing a first catalyst precursor comprising iron and a second catalyst precursor comprising molybdenum in a hydrocarbonaceous material comprising a heavy oil fraction, an amount of the molybdenum in the second catalyst precursor in the hydrocarbonaceous material being about 75 wppm to about 250 wppm, based on inclusion of the catalyst/system into a heavy oil feedstock to be hydroconverted, a weight ratio of the iron in the first catalyst precursor to the molybdenum in the second catalyst precursor in the hydrocarbonaceous material being about 10 to about 30;
sulfiding the first catalyst precursor and the second catalyst precursor to form the sulfided catalyst system; and
contacting the sulfided catalyst system with a sulfur source and hydrogen gas under conditions sufficient to form an activated catalyst system.

17. An activated catalyst system formed by a method comprising:
- dispersing a first non-sulfur-containing catalyst precursor comprising iron in a hydrocarbonaceous material comprising a heavy oil fraction, the hydrocarbonaceous material further comprising a sulfided molybdenum catalyst, an amount of the molybdenum in the sulfided molybdenum catalyst in the feedstock being about 75 wppm to about 250 wppm, based on inclusion of the catalyst/system into a heavy oil feedstock to be hydroconverted;
- sulfiding the first catalyst precursor to form a sulfided catalyst system; and
- contacting the sulfided catalyst system with a sulfur source and hydrogen gas under conditions sufficient to form an activated catalyst system,
- wherein a weight ratio of the iron to the molybdenum in the sulfided catalyst system is from about 10 to about 30.

* * * * *